(12) United States Patent
Ruskin et al.

(10) Patent No.: US 7,584,290 B2
(45) Date of Patent: Sep. 1, 2009

(54) SESSION MOBILITY USING DIGITAL ITEMS

(75) Inventors: Paul Adam Ruskin, Wollongong (AU); Ian Shaw Burnett, Wollongong (AU)

(73) Assignee: University of Wollongong, Wollongong, NSW (AU)

( * ) Notice: Subject to any disclaimer, the term of this patent is extended or adjusted under 35 U.S.C. 154(b) by 434 days.

(21) Appl. No.: 10/264,503

(22) Filed: Oct. 4, 2002

(65) Prior Publication Data

US 2003/0079057 A1 Apr. 24, 2003

(51) Int. Cl.
G06F 15/16 (2006.01)
(52) U.S. Cl. .................................. 709/231; 709/227
(58) Field of Classification Search .................. 709/232, 709/227, 230, 231
See application file for complete search history.

(56) References Cited

U.S. PATENT DOCUMENTS

2002/0107973 A1* 8/2002 Lennon et al. .............. 709/231
2002/0138495 A1* 9/2002 Chang et al. ................ 707/102
2002/0152261 A1* 10/2002 Arkin et al. ................. 709/202
2002/0160773 A1* 10/2002 Gresham et al. ............. 455/431
2004/0030798 A1* 2/2004 Andersson et al. .......... 709/232
2005/0091408 A1* 4/2005 Parupudi et al. ............ 709/246

FOREIGN PATENT DOCUMENTS

WO WO 01/67213 A2 9/2001

* cited by examiner

*Primary Examiner*—Nathan J Flynn
*Assistant Examiner*—Chirag R Patel
(74) *Attorney, Agent, or Firm*—Husch Blackwell Sanders Welsh & Katz

(57) ABSTRACT

A method of transferring a digital item session state between at least two devices (A, B) using digital items, the method including: providing a content digital item to one of said devices (B); the one of said devices (B) configuring said content digital item according to predetermined requirements; transferring one or more context digital items representing the content digital item's session state from the other device (A) to the one device (B) and the one device (B) configuring said content digital item on the basis of the context digital item. A method of configuring a digital content item on the basis of a stored digital context item is also disclosed.

26 Claims, 1 Drawing Sheet

FIGURE 1
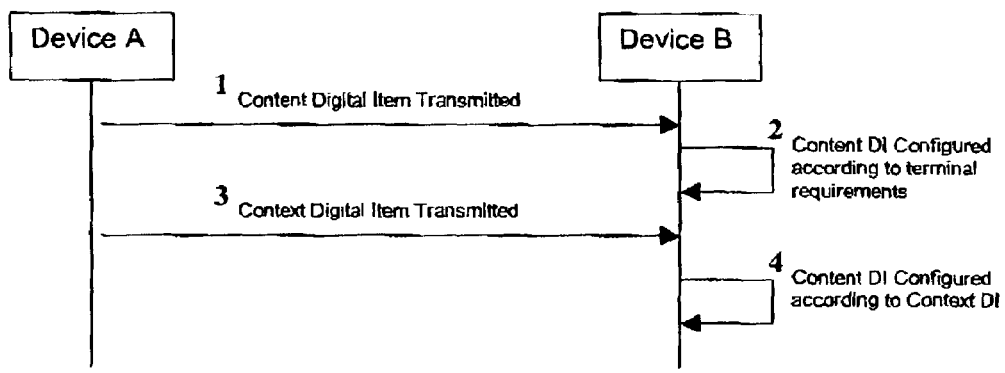
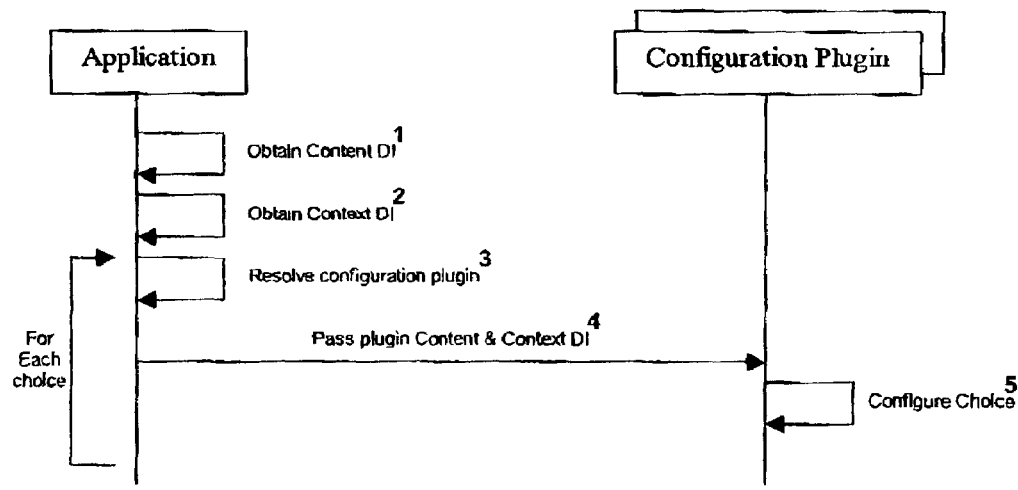
FIGURE 2

SESSION MOBILITY USING DIGITAL ITEMS

TECHNICAL FIELD

The present invention relates to digital items which are considered as a digital object containing structure, metadata and resources. The invention more particularly relates to the transfer of session states between devices using digital items.

BACKGROUND OF THE INVENTION

The following terms are used throughout the specification with the meanings and in the context described.

Digital item—a digital object containing structure, metadata and resources. Digital items may be declared using the Digital Item Declaration Language (DIDL), typically a DIDL specified by the MPEG standard, however, it will be appreciated the invention is not limited to digital item defined by such a DIDL and other definitions are equally applicable.

Content digital item—a digital item created for the purpose of allowing the distribution of content including multimedia files, documents and the like.

Context digital item—a digital item created for purpose of capturing the session state of a content digital item. A context digital item may include information relating to the current configuration of a content digital item, the user preferences used to configure a content digital item, the terminal capabilities of the device upon which the content digital item was configured.

Situations may arise where a user who is using a digital item on a device may want to use the digital item on a different device and yet maintain its state.

As an example, consider the following scenario:

A user has a location aware multimedia system within their house. Each device within the system has the capability to render digital items. Devices within the system include: televisions and stereos (different stereos in different rooms).

The user requests a digital item that represents a music album. The digital item contains multiple soundtracks, as well as associated video clips. The user initially starts viewing the digital item on their television. However, they also want the capability to walk through the house and listen to the digital item wherever they are.

As the user wanders through the house the digital item must be transported to the device that is in the room closest to the user. When more than one device exists within the room the user may express a preference as to which device is used to render the digital item.

To allow the user to receive an uninterrupted listening experience the digital item and its current state (i.e: which track is playing and the position within the track) must be transported between devices when a handover occurs.

To allow transportation of a digital item between rendering devices to occur transparently to the user the current state of the user's session must be preserved. In this context the user's session refers to: the digital item's configuration and its current rendering state. The digital item declaration language (DIDL) provides tools that may be used to achieve this goal.

The DIDL provides a set of elements that allow the preservation of session state.

These elements include:

Annotation: this element allows an end user to associate descriptors, Assertions, and Anchors with a Digital Item without affecting the Digital Item's signature;

Descriptors allow the inclusion of meta data from any schema allowing applications to add descriptions of their current state;

Assertions: this element allows the predicates within a choice to be asserted as true or false. An end user may add Assertions (using Annotations) to a digital item to preserve the state of the selections made within choices.

Anchors: this element allows the creation of bookmarks within media resources. Anchors could thus be used to record the current status of a tracks playback.

DISCLOSURE OF THE INVENTION

The present invention seeks to provide a method and system to provide the desirable outcomes described above.

According to one aspect, the present invention provides a method of transferring a digital item session state between at least two devices using digital items, the method including the following steps:

i) providing a content digital item to one of said devices.

ii) said one of said devices configuring said content digital item according to predetermined requirements.

iii) transferring one or more context digital items representing a session state of the content digital item from the other device to said one device.

iv) said one device configuring said content digital item on the basis of the context digital item.

In one variation, the order of steps ii) and iii) may be swapped, if desired. An alternate variation combines steps i) and iii) through the provision of a reference to a content digital item in a context digital item. In one embodiment, the reference may be a URI from which the said content digital item is recoverable.

For preference, each content digital item contains one or more choices and step iv) of the method includes for each choice in the content digital item:

a) providing a number of choice resolution modules for resolving predetermined choice types;

b) examining descriptors relating to the choice to determine what type of choice is to be resolved;

c) determining whether a choice resolution module is available to handle the type of choice and if so:

c1) enabling the choice resolution module and providing it with access to the choice and the context digital item; and c2) configuring the choice using the choice resolution module on the basis of information within the choice and the context digital item, and rules within the choice resolution module.

According to second aspect, the present invention provides apparatus for transferring a digital item session state between at least two devices using digital items, the apparatus including:

i) means for providing a content digital item to one of said devices;

ii) said one of said devices including means for configuring said content digital item according to predetermined requirements;

iii) means for transferring one or more context digital items representing a session state of the content digital item from the other device to said one device; and iv) said one device including means for configuring said content digital item on the basis of the context digital item.

Preferably, the content digital item is provided by the other device. The other device may do this by providing a reference to the location of the content digital item or may provide the content digital item directly by transmitting it to the one device. Transfer of the session state may be accomplished using multiple context digital items. Rather than transferring a distinct context digital item, the context information may be embedded in the content digital item when it is provided to one of said devices.

In another aspect, the context digital item representing the content digital item's session state may be provided and stored for use by a configuration device for configuring the content digital item. In such an arrangement, the same device may provide the context digital item, store it and then use it for configuring the content digital item.

BRIEF DESCRIPTION OF DRAWINGS

Preferred embodiments of the invention will now be described, by way of example only, with reference to the accompanying drawings in which:

FIG. 1 shows a block schematic diagram of the session transfer method according to one embodiment of the invention; and FIG. 2 shows a block schematic diagram illustrating the configuration process according to one embodiment of the invention.

PREFERRED EMBODIMENTS OF THE INVENTION

An embodiment will be described illustrating the case where a digital item is being rendered on one device and it is required to move the digital item and its rendering to another device. It is possible that the content being rendered is not contained with the digital item, but is being sourced from across a network.

The mechanism by which a digital item's session state may be transported between two devices is outlined below. This embodiment illustrates for the scenario illustrated in FIG. 1 how the transfer of a digital item's session state from Device A to Device B may be achieved.

1. Device B obtains the content digital item.

The purpose of this step is to allow Device B to obtain a copy of the digital item whose session state is to be transferred. Methods by which Device B may obtain the digital item include:

Device A provides Device B with a reference indicating the location from which the content digital item may be retrieved. Device B then retrieves the digital item. This method may be used to provide scalability in situations which Device A has a limited bandwidth connection and the content digital item is available from another location.

Device A transmits the entire content digital item to Device B (see FIG. 1). This method may be appropriate in cases where devices are being used in a peer-to-peer manner.

2. Device B configures the content digital item according to its terminal requirements.

A digital item may require customisation to meet the specific requirements of the device upon which it is to be rendered. Customisation may involve configuring the digital item based on capabilities including the device's displays capabilities, audio capabilities and network capabilities.

Note that the device may maintain its own context digital item that permits it to perform this configuration. The device's context digital item may be updated by devices within the network (or reference devices within the network) to permit an accurate description of the device's capabilities.

3. Device A transmits a context digital item representing the content digital item's session state. This digital item records the state of the choices that have been made within the content digital item as well as the status of playback (locations within tracks being rendered, etc).

The context digital item that is transmitted represents the current session state of the content digital item on Device A. The context digital item is constructed by Device A and may capture information including but not limited to: the current state of rendering of the digital item, the user's preferences used to configure the digital item.

4. Device B then configures the content digital item on the basis of the context digital item so that the user's session state is preserved. Device B can then begin rendering the digital item.

Device B uses the context digital item sent by Device A to configure the content digital item.

Device B must apply some logic when performing the configuration. It may be the case that the Context digital item describes a session state that cannot be achieved on Device B due to its capabilities.

In some situations the entire session state for the content digital item may not be transmitted between Device A and Device B in one context digital item. In these cases it is possible to transmit multiple context digital items from Device A to Device B. Each context digital item sent may contain information regarding different components of the session state or an update on previously sent state information.

An embodiment where multiple transmissions of context digital items occur is described below:

1. Device A transmits a context digital item to Device B containing both the user's preferences and the content digital item's current rendering state.

2. Device B configures its content digital item on the basis of this information. It then discovers that it will require an additional software component to be downloaded.

3. Device B downloads the additional software component.

4. During the time that Device B was downloading the software component the rendering state on Device A has changed. Device A sends Device B a context digital item containing only information regarding the rendering state of the content digital item.

By maintaining the session state in a context digital item that is independent of the content digital item several benefits may be achieved. The main benefit is that a scalable representation of the session is provided.

This allows the possibility of sending incremental session state updates while trying to synchronise the state between two devices. By decoupling it in this manner partial representations of the context may be sent without being required to transmit the entire digital item. This is especially useful when the digital item has content embedded within it.

In the embodiment described above the content digital item requires configuration by the device to take into account the device capabilities (expressed in a context digital item) and also the state information contained in the context digital item transmitted by the first device.

The configuration process tailors the digital item so that the media resources it presents are appropriate for the situation and to also permit the maintenance of a user's session. A preferred method by which a digital item may be configured on the basis of a context digital item is described below and illustrated in FIG. 2.

The configuration method is as follows:

Step 1. The application obtains the content digital item.

Step 2. The application obtains the context digital item.

Step 3. For each choice in the content digital items the configuration controller:

a. examines the choice's descriptors to determine what type of choice is to be resolved.
b. Determines whether it has a registered configuration Plugin to handle the specific type of choice.
c. If it does then
 i. the configuration controller calls the configuration Plugin and provides it with access to the choice and the context digital item.
 ii. The configuration Plugin configures the choice on the basis of the information in the choice and context digital item and the configuration Plugin's internal business rules.

Referring to step 1, an application may obtain a content digital item in several ways. These include:
 Retrieval of the content digital item from a local store (e.g: local hard disk).
 Retrieval of the content digital item via a Uniform Resource Identifier (URI).
 Reception of a content digital item transmitted by another application.

Referring to step 2, an application may obtain a context digital item in several ways. These include:
 The context digital item may be stored locally. This is possible in the case where the context digital item to be used has information regarding the device's terminal capabilities.
 The context digital item may be transmitted to the application by another application. This situation may occur when a digital item's session state is being transferred from one device to another.
 The application may retrieve the context digital item via a network.

The whole of Step 3 is repeated for each choice in the content digital item.

Referring to step 3a, choices contained with a digital item possess descriptors that provide information describing the choice. The information contained within the descriptors allows determination of what the choice refers to and what decisions are required to be made to allow its configuration.

The application examines the descriptors and determines what the choice refers to.

Referring to step 3b, after determining what the choice refers to, the application determines whether it has a registered Plugin that is able to resolve the choice.

In the case where the application does not have a Plugin currently registered for handling the specific choice it may be possible that the choice has a descriptor that indicates the location from which an appropriate Plugin may be obtained. In this case the application may download and register the Plugin to allow it to resolve the choice.

If an appropriate configuration Plugin is found (Step 3c), the application loads the configuration Plugin so that it may be used.

The application passes to the configuration Plugin the choice that it is to resolve and the context digital item. The configuration Plugin uses its business rules and the context digital item to resolve the choice appropriately.

Some choice elements in a digital item may be co-dependent. It may be necessary to simultaneously resolve multiple choices to achieve the desired solution.

An embodiment where this may occur is where a digital item has a video stream available at multiple resolutions with multiple bit rate variations for each resolution. When resolving the choices the application must trade off fidelity for screen size.

This situation may be catered for in the above scenario. To do this a configuration Plugin may be provided that accepts multiple choices. It can then analyse the choices and their dependencies and make the appropriate decisions.

An application may not necessarily have all of the configuration Plugins required to resolve the choices with a digital item. In this situation an application may have access to a network-based repository from which it can attempt to retrieve an appropriate configuration Plugin. The digital item itself may include the necessary configuration Plugin or provide a reference to it.

It will be appreciated that further embodiments, examples and exemplifications of the invention are possible without departing from the spirit or scope of the invention described.

The invention claimed is:

1. A method of transferring a digital item session state between at least two devices using digital items to deliver content to a user depending upon which of the at least two devices is closer to the user, the method including the following steps:
 i) a second one of said devices rendering content to the user when the second device is relatively closer to the user than any other device of the at least two devices;
 ii) providing a content digital item to a first one of said devices;
 iii) said first device configuring said content digital item according to predetermining requirements;
 iv) transferring one or more context digital items representing a session state of the content digital item from a said second device to said first device;
 v) said first device configuring said content digital item on the basis of the context digital item;
 vi) said first device rendering content to the user when the first device is relatively closer to the user than any other device of the at least two devices.

2. A method of transferring a digital item session state between at least two devices using digital items to deliver content to a user depending upon which of the at least two devices is closer to the user, the method including the following steps:
 i) a second of the devices rendering content to the user when said second device is relatively closer to the user than any other device of the at least two devices;
 ii) providing a content digital item to a first device;
 iii) transferring one or more context digital items representing a session state of the context digital item from the second device to said first device; and
 iv) said first device configuring said content digital item according to predetermined requirements;
 v) said first device configuring said content digital item on the basis of the context digital item or items;
 iv) said first device rendering content to the user when the first device is relatively closer to the user than said second device; and
 wherein steps iv) and v) may be performed in any order.

3. A method of transferring a digital item session state between at least two devices using digital items according to claim 1, wherein step ii) of the method includes transferring a context digital item containing a reference to the content digital item from said second device to said first device and said first device obtaining said content digital item using said reference.

4. A method of transferring a digital item session state between at least two devices using digital items according to claim 3, wherein the reference is a Uniform Resource Identifier (URI).

5. A method of transferring a digital item session state between at least two devices using digital items according to claim 1 wherein the session state includes a number of session state updates.

6. A method of transferring a digital item session state between at least two devices using digital items according to claim 1 wherein the digital item includes embedded media resources.

7. A method of transferring a digital item session state between at least two devices using digital items according to claim 1 wherein said predetermined requirements include terminal requirements.

8. A method of transferring a digital item session state between at least two devices using digital items according to claim 1 wherein each content digital item contains one or more choices and step v) of the method includes for each choice in the content digital item:
   a) providing a number of choice resolution modules for resolving predetermined choice types;
   b) examining descriptors relating to the choice to determine what type of choice is to be resolved;
   c) determining whether a choice resolution module is available to handle the type of choice and if so:
      c1) enabling the choice resolution module and providing it with access to the choice and the context digital item; and
      c2) configuring the choice using the choice resolution module on the basis of information within the choice and the context digital item, and rules within the choice resolution module.

9. A method of transferring a digital item session state between at least two devices using digital items according to claim 8, wherein, if the choice resolution module is not available from those provided, obtaining it from elsewhere.

10. A method of transferring a digital item session state between at least two devices using digital items according to claim 9 wherein the choice provides a descriptor indicating a source for obtaining said choice resolution module.

11. A method of transferring a digital item session state between at least two devices using digital items according to claim 9 wherein said descriptors include information allowing determination of what the choice refers to and what decisions are required to be made to allow configuration of the choice.

12. Apparatus for transferring a digital item session state between at least two devices using digital items to render content to a user, the apparatus including:
   i) means for providing a content digital item to a first device;
   ii) said first device including means for configuring said content digital item according to predetermined requirements;
   iii) means for transferring one or more context digital items representing a session state of the content digital item from a second device to said first device;
   iv) said first device including means for configuring said content digital item on the basis of the context digital item;
   v) said first and second devices including means for rendering content to the user; and
   wherein said first device renders content to the user when the first device is relatively closest to the user and said second device renders content to the user when the second device is relatively closest to the user.

13. Apparatus for transferring a digital item session state between at least two devices using digital items according to claim 12 wherein the content digital item is provided by the second device.

14. Apparatus for transferring a digital item session state between at least two devices using digital items according to claim 13 wherein the second device provides the content digital item to said first device by providing a reference to the location of the content digital item.

15. Apparatus for transferring a digital item session state between at least two devices using digital items according to claim 13 wherein the second device provides the content digital item to said first device by transmitting it to said first device.

16. Apparatus for transferring a digital item session state between at least two devices using digital items according to claim 12 wherein the context digital item is transferred to said first device by embedding the context digital item in the content digital item when it is provided to said first device.

17. Apparatus for transferring a digital item session state between at least two devices using digital items according to claim 12 including means for transferring a context digital item containing a reference to the content digital item from said second device to said first device and said first device obtaining said content digital item using said reference.

18. Apparatus for transferring a digital item session state between at least two devices using digital items according to claim 17, wherein the reference is a Uniform Resource Identifier (URI).

19. Apparatus for transferring a digital item session state between at last two devices using digital items according to claim 12 wherein said session state includes a number of session state updates.

20. A method of configuring a content digital item, the method including the following steps:
   i) providing said content digital item to a configuration device;
   ii) said configuration device configuring said content digital item according to predetermined requirements;
   iii) providing and storing one or more context digital items representing a session state of the content digital item;
   iv) said configuration device configuring said content digital item on the basis of the context digital item or item ; and
   i) rendering content to a user through one of a first and second device depending upon which of the first and second device is relatively closest to the user.

21. A method of configuring a content digital item, the method including the following steps:
   i) providing said content digital item to a device;
   ii) providing and storing one or more context digital items representing a predetermined requirements;
   iii) said device configuring said content digital item according to predetermined requirements;
   iv) said device configuring said content digital item on the basis of the context digital item or items; and
   wherein steps iii) and iv) may be performed in any; and
   v) rendering content to a user through one of a first and second device depending upon which of the first and second device is relatively closest to the user.

22. A method according to claim 20 wherein the context digital item includes one or more of the following: a current configuration of the content digital item; user preferences for configuration of the content digital item and terminal capabilities of a device upon which the content digital item was configured.

23. A method according to claim 20 including providing the context digital item from a store in said device, by transmission from another device or by retrieval from a network.

24. Apparatus for configuring a content digital item, the apparatus including:
  i) means for providing a content digital item to at least one of a first and second device;
  ii) said at least one of the first and second device including means for configuring said content digital item according to predetermined requirements;
  iii) means for providing and storing one or more context digital items representing a session state of the content digital item; and
  iv) said at least one of said first and second device further including means for configuring said content digital item on the basis of the context digital item; and
  v) said first and second devices including means for rendering content to the user; and
  wherein said first device renders content to the user when the first device is relatively closest to the user and said second device renders content to the user when the second device is relatively closest to the user.

25. Apparatus according to claim 24 wherein the context digital item includes one or more of the following:
  a current configuration of the content digital item;
  user preferences for configuration of the content digital item and terminal capabilities of a device upon which the content digital item was configured.

26. Apparatus according to claim 24 wherein the means for providing the context digital item is a store in said device; means for receiving the context digital item from another device or means for retrieving the context digital item from a network.

* * * * *

UNITED STATES PATENT AND TRADEMARK OFFICE
CERTIFICATE OF CORRECTION

PATENT NO. : 7,584,290 B2
APPLICATION NO. : 10/264503
DATED : September 1, 2009
INVENTOR(S) : Ruskin et al.

It is certified that error appears in the above-identified patent and that said Letters Patent is hereby corrected as shown below:

Column 6, line 26: please delete "predetermining" and insert --predetermined--.

Column 8, line 43: please delete "digital item or item;" and insert --digital item or items;--.

Column 8, line 52: please delete "requirements" and insert --requirement--.

Column 8, line 59: please delete "wherein steps iii) and iv) may be performed in any; and" and insert --wherein steps iii) and iv) may be performed in any order; and--.

Signed and Sealed this

Fourteenth Day of December, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,584,290 B2 | Page 1 of 1 |
| APPLICATION NO. | : 10/264503 | |
| DATED | : September 1, 2009 | |
| INVENTOR(S) | : Ruskin et al. | |

It is certified that error appears in the above-identified patent and that said Letters Patent is hereby corrected as shown below:

Title Page, Item [30] after [22] insert

-- [30] Foreign Application Priority Data

Australian Priority Claim PR8152 dated October 8, 2001

Oct. 8, 2001  [AU]    Australia..........................PR8152--

Signed and Sealed this
Thirty-first Day of May, 2011

David J. Kappos
*Director of the United States Patent and Trademark Office*